United States Patent
Park et al.

(10) Patent No.: US 10,694,230 B2
(45) Date of Patent: *Jun. 23, 2020

(54) APPARATUS AND METHOD FOR TRANSMITTING MULTIMEDIA FRAME IN BROADCAST SYSTEM

(71) Applicant: Samsung Electronics Co., Ltd., Suwon-si, Gyeonggi-do (KR)

(72) Inventors: Kyung-Mo Park, Seoul (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,808

(22) Filed: Apr. 13, 2015

(65) Prior Publication Data

US 2015/0222936 A1   Aug. 6, 2015

Related U.S. Application Data

(63) Continuation of application No. 13/973,241, filed on Aug. 22, 2013, now Pat. No. 9,009,347, which is a (Continued)

(30) Foreign Application Priority Data

Jan. 19, 2011 (KR) .......................... 10-2011-0005650

(51) Int. Cl.
*H04N 21/236* (2011.01)
*H04N 21/242* (2011.01)
(Continued)

(52) U.S. Cl.
CPC ....... *H04N 21/236* (2013.01); *H04L 29/0653* (2013.01); *H04L 29/06476* (2013.01);
(Continued)

(58) Field of Classification Search
CPC ........ H04Q 11/0478; H04L 2012/5679; H04L 12/5601; H04L 2012/5652; H04L 49/3081; H04L 49/203
See application file for complete search history.

(56) References Cited

U.S. PATENT DOCUMENTS 5,519,698 A * 5/1996 Lyles .................. H04L 12/5601
370/411
5,905,872 A   5/1999 Desimone et al.
(Continued)

FOREIGN PATENT DOCUMENTS

CN        101513009 A      8/2009
EP        0 571 166 A2    11/1993
(Continued)

OTHER PUBLICATIONS

Stefan Doehla et al., On the current set of MMT documents, 93. MPEG Meeting, ISO/IEC JTC1/SC29/WG11, Jul. 22, 2010, paragraph [4.8.4]—paragraph [4.9.2], paragraph [02.1]—paragraph [02.3], paragraph [4.9.2], Geneva, Switzerland.
(Continued)

*Primary Examiner* — Hsiungfei Peng
(74) *Attorney, Agent, or Firm* — Jefferson IP Law, LLP (57) ABSTRACT

An apparatus and a method for transmitting a multimedia frame through a heterogeneous network in a broadcast system supporting a multimedia service based on an internet protocol are provided. The method includes generating header information including a frame identifier distinguishing a multimedia frame and information measuring a quality of a connection service between network layers and end-to-end network capabilities, and combining the header information and multimedia data to configure the multimedia frame.

4 Claims, 4 Drawing Sheets

Related U.S. Application Data continuation of application No. 13/353,502, filed on Jan. 19, 2012, now Pat. No. 9,544,052.

(51) Int. Cl.

| | | |
|---|---|---|
| *H04N 21/63* | (2011.01) | |
| *H04N 21/61* | (2011.01) | |
| *H04N 21/643* | (2011.01) | |
| *H04L 29/06* | (2006.01) | |
| *H04W 80/04* | (2009.01) | |

(52) U.S. Cl.
CPC .......... *H04L 69/22* (2013.01); *H04N 21/242* (2013.01); *H04N 21/64322* (2013.01); *H04W 80/04* (2013.01)

(56) References Cited

U.S. PATENT DOCUMENTS

| | | | |
|---|---|---|---|
| 6,628,614 B2 * | 9/2003 | Okuyama | H04L 12/5601 370/230.1 |
| 6,839,330 B1 * | 1/2005 | Chitre | H03M 7/30 370/310.1 |
| 6,937,612 B1 * | 8/2005 | Mauger et al. | 370/465 |
| 7,969,997 B1 | 6/2011 | Noh et al. | |
| 8,369,350 B2 | 2/2013 | Koo et al. | |
| 8,589,577 B2 | 11/2013 | Roullet et al. | |
| 8,630,312 B2 | 1/2014 | Shao et al. | |
| 8,650,604 B2 | 2/2014 | Hsu et al. | |
| 8,719,883 B2 | 5/2014 | Ishii et al. | |
| 9,009,347 B2 * | 4/2015 | Park et al. | 709/236 |
| 2003/0101274 A1 | 5/2003 | Yi et al. | |
| 2003/0135631 A1 | 7/2003 | Li et al. | |
| 2004/0039833 A1 * | 2/2004 | Ludwig | H04L 29/06 709/230 |
| 2004/0162911 A1 | 8/2004 | Sperschneider et al. | |
| 2004/0181811 A1 * | 9/2004 | Rakib | H04L 63/062 725/122 |
| 2004/0196853 A1 | 10/2004 | Saito et al. | |
| 2004/0221307 A1 | 11/2004 | Arai et al. | |
| 2005/0036497 A1 | 2/2005 | Kawakami | |
| 2005/0238007 A1 * | 10/2005 | Taylor | H04L 41/0663 370/389 |
| 2006/0291817 A1 | 12/2006 | Mughal et al. | |
| 2007/0115969 A1 | 5/2007 | Isnardi | |
| 2008/0005776 A1 | 1/2008 | Versteeg et al. | |
| 2008/0056273 A1 | 3/2008 | Pelletier et al. | |
| 2009/0125959 A1 | 5/2009 | Oh et al. | |
| 2009/0264138 A1 | 10/2009 | Kang et al. | |
| 2010/0195499 A1 | 8/2010 | Dattagupta et al. | |
| 2012/0320925 A1 | 12/2012 | Park et al. | |
| 2013/0003579 A1 | 1/2013 | Lu et al. | |
| 2013/0336325 A1 | 12/2013 | Park et al. | |
| 2014/0317664 A1 | 10/2014 | Park et al. | |

FOREIGN PATENT DOCUMENTS

| | | |
|---|---|---|
| EP | 0 975 123 A1 | 1/2000 |
| EP | 0 978 967 A2 | 2/2000 |
| JP | 10-150470 A | 6/1998 |
| JP | 2004-363841 A | 12/2004 |
| JP | 2005-064594 A | 3/2005 |
| JP | 2014-507879 A | 3/2014 |
| JP | 2014-519789 A | 8/2014 |
| JP | 2016-140089 A | 8/2016 |
| KR | 10-2005-0044207 A | 5/2005 |
| KR | 10-2006-0114080 A | 11/2006 |
| KR | 10-2007-0078238 A | 7/2007 |
| KR | 10-2008-0044828 A | 5/2008 |
| KR | 10-2010-0036511 A | 4/2010 |
| WO | 00/74430 A2 | 12/2000 |
| WO | 2008/027005 A2 | 3/2008 |

OTHER PUBLICATIONS

DVB Organization, Digital Video Broadcasting (DVB): Interaction channel for satellite distribution systems: 2nd generation, TM-RCS1001 r2—Draft NG Normative LL-added_section-6.8.1.2.2.doc, Jun. 30, 2010, paragraph [06.6]—paragraph [06.8], Geneva, Switzerland.

Doug Young Suh, Extended NAL (Network Abstraction Layer) for MMT, 91. MPEG Meeting, ISO/IEC JTC1/SC29/WG11, Jan. 25, 2010, Kyoto, Japan.

Ernesto Exposito et al., Building self-optimized communication systems based on applicative cross-layer information, Computer Standards & Interfaces, Elsevier Sequoia. Lausanne, CH, vol. 31, No. 2, ISSN: 0920-5489, DOI:10.1016/J.CSI.2008.05.008, Feb. 1, 2009, pp. 354-361.

\* cited by examiner

APPARATUS AND METHOD FOR TRANSMITTING MULTIMEDIA FRAME IN BROADCAST SYSTEM

PRIORITY

This application is a continuation of a prior application Ser. No. 13/973,241, filed on Aug. 22, 2013, which is a continuation of prior application Ser. No. 13/353,502, filed on Jan. 19, 2012, and issued as U.S. Pat. No. 8,544,052 on Sep. 24, 2013, which claimed the benefit under 35 U.S.C. § 119(a) of a Korean patent application filed on Jan. 19, 2011 in the Korean Industrial Property Office and assigned Serial number 10-2011-0005650, the entire disclosure of each of which is hereby incorporated by reference.

BACKGROUND OF THE INVENTION

1. Field of the Invention

The present invention relates to an apparatus and a method for transmitting a multimedia frame in a broadcast system. More particularly, the present invention relates to an apparatus and a method for transmitting a multimedia frame through a heterogeneous network in a broadcast system supporting a multimedia service based on an internet protocol.

2. Description of the Related Art

A Moving Picture Experts Group-2 Transport Stream (MPEG-2 TS) is typically used for transmitting a multimedia content in a broadcast network. The MPEG-2 TS is used as a representative transmission technology for transmitting bit streams (a plurality of encoded video bit streams) in which a plurality of broadcast programs are multiplexed in a transmission environment having an error. For example, the MPEG-2 TS is suitable for being used for broadcasting a digital TV signal in a multimedia age.

Figure 1:
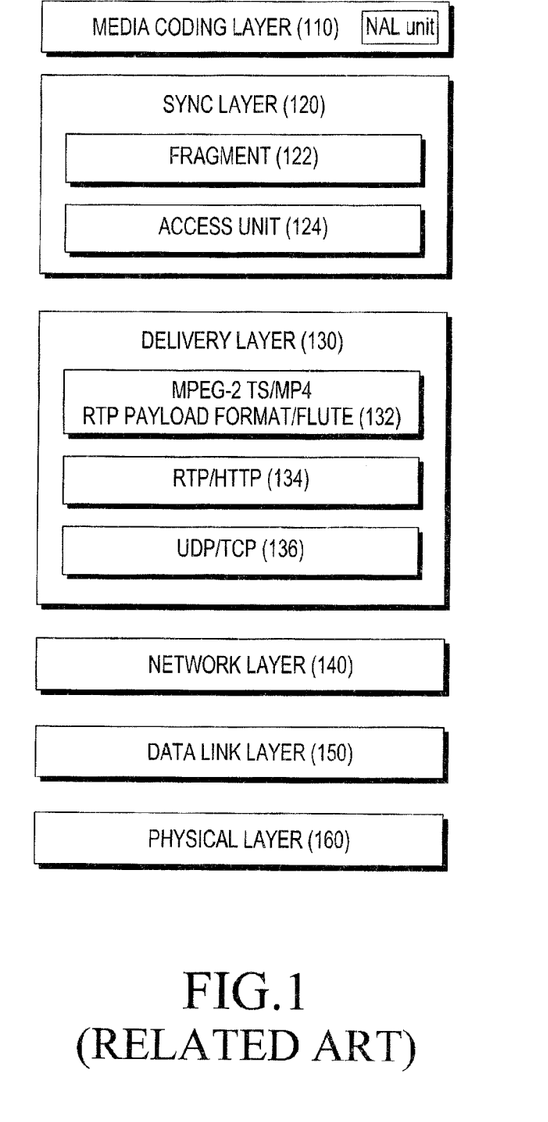
FIG. 1 illustrates a structure of layers for supporting a Moving Picture Experts Group-2 Transport Stream (MPEG-2 TS) according to the related art.

FIG. 1 illustrates a structure of layers for supporting the MPEG-2 TS according to the related art.

Referring to FIG. 1, layers for supporting the MPEG-2 TS include a media coding layer 110, a synchronous (sync) layer 120, a delivery layer 130, a network layer 140, a data link layer 150, and a physical layer 160.

The media coding layer 110 and the sync layer 120 are constructed in a format by which media data may be easily used in the basic unit of a record or a transmission. The delivery layer 130, the network layer 140, the data link layer 150, and the physical layer 160 record a data block (e.g. "AU") of a format constructed by the sync layer 120 in a separate recording medium or configure a multimedia frame for a transmission. The configured multimedia frame is transmitted to a subscriber terminal through a predetermined network.

For this purpose, the sync layer 120 includes a fragment block 122 and an access unit 124. The delivery layer 130 includes an MPEG-2 TS/MP4 132, an RTP/HTTP 134, and a UDP/TCP 136.

However, the MPEG-2 TS has several limitations in supporting a multimedia service. The limitations of the MPEG-2 TS include one-way communication, an inefficiency of a transmission due to a fixed frame size, and a generation of unnecessary overheads in a transmission using an Internet Protocol (IP) and a transmission protocol specialized for an audio/video.

Accordingly, a MPEG Media Transport (MMT) standard is newly proposed in the MPEG as a multimedia transmission technology for supporting a multimedia service based on an MPEG technology. The MMT standard is proposed by the MPEG in order to overcome the limitations of the MPEG-2 TS.

For example, the MMT standard may be applied for efficiently transmitting hybrid content through a heterogeneous network. Hybrid content denotes a set of contents having a multimedia element by a video/audio/application. The heterogeneous network denotes a network where a broadcast network and a communication network coexist.

The MMT standard intends to define a transmission technology closer to an IP, which is a basic technology in a transmission network for a multimedia service. Accordingly, the MMT standard is to representatively provide an efficient MPEG transmission technology in a multimedia service environment changed based on the IP, and its standardization is in progress together with continuous research. A method is desired that provides effective MPEG transmission technology in a multimedia service environment intending to provide a hybrid network and hybrid content in the MMT standard.

SUMMARY OF THE INVENTION

Aspects of the present invention are to address at least the above-mentioned problems and/or disadvantages and to provide at least the advantages described below. Accordingly, an aspect of the present invention is to provide a method of configuring a multimedia frame, which can be transmitted through a heterogeneous network in a broadcast system supporting a multimedia service based on an internet protocol.

Another aspect of the present invention is to provide a method of configuring a multimedia frame based on multimedia data for hybrid content or a hybrid service based on an MMT technology.

Another aspect of the present invention is to provide a method of configuring a multimedia frame for a transmission of an Access Unit (AU) according to hybrid content or a hybrid service based on an MMT technology and transmitting the configured multimedia frame.

Another aspect of the present invention is to provide a method of configuring a multimedia frame to be transmitted through a heterogeneous network such that header information contains a frame identifier and information used for measuring a quality of a connection service between network layers and end-to-end network capabilities in a broadcast system supporting a multimedia service based on an internet protocol.

In accordance with an aspect of the present invention, a method of configuring a multimedia frame to be transmitted through a heterogeneous network in a broadcast system supporting a multimedia service based on an internet protocol is provided. The method includes generating header information including a frame identifier identifying a multimedia frame and information measuring a quality of a connection service between network layers and end-to-end network capabilities, and combining the header information and multimedia data to configure the multimedia frame.

In accordance with another aspect of the present invention, an apparatus for configuring a multimedia frame to be transmitted through a heterogeneous network in a broadcast system supporting a multimedia service based on an internet protocol is provided. The apparatus includes a multimedia data generator for generating multimedia data according to a hybrid content or a hybrid service, and a multimedia frame configuration unit for generating header information including a frame identifier distinguishing a multimedia frame and information measuring a quality of a connection service between network layers and end-to-end network capabilities, and for combining the header information and multimedia data to configure the multimedia frame.

In accordance with another aspect of the present invention, a subscriber terminal is provided. The subscriber terminal includes a communication unit for transmitting and receiving a multimedia frame, a multimedia data generator for generating multimedia data according to a hybrid content or a hybrid service, and a multimedia frame configuration unit for generating the header information, and for generating the multimedia frame based on the header information and at least a portion of the multimedia data, wherein the header information includes a frame identifier identifying the multimedia frame and Quality of Service (QoS) information identifying a quality of a connection service between network layers and end-to-end network capabilities.

Accordingly, exemplary embodiments of the present invention provide a hybrid service or hybrid content through a heterogeneous network, so that an effective MPEG transmission in a multimedia environment is supported. Meanwhile, other various effects will be implicitly or explicitly disclosed in a detailed description according to the exemplary embodiments of the present invention described below.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described below discuss a structure of layers defined in a Motion Picture Experts Group (MPEG) Media Transport (MMT) standard. Further, the exemplary embodiments of the present invention propose to configure a multimedia frame and will describe in detail layers for generating the multimedia frame in a structure of the layers defined by the MMT standard. The multimedia frame denotes a transport frame for an MMT service and a packet of an MMT access unit. The multimedia frame includes a quality of service information related to required transport information.

The exemplary embodiments of the present invention describe a construction of header information for configuring the multimedia frame in more detail. A payload of the multimedia frame may be replaced with a configuration of multimedia data having a desired size by fragmenting or combining the multimedia data provided in the unit of a predetermined size in a higher layer.

Figure 2:
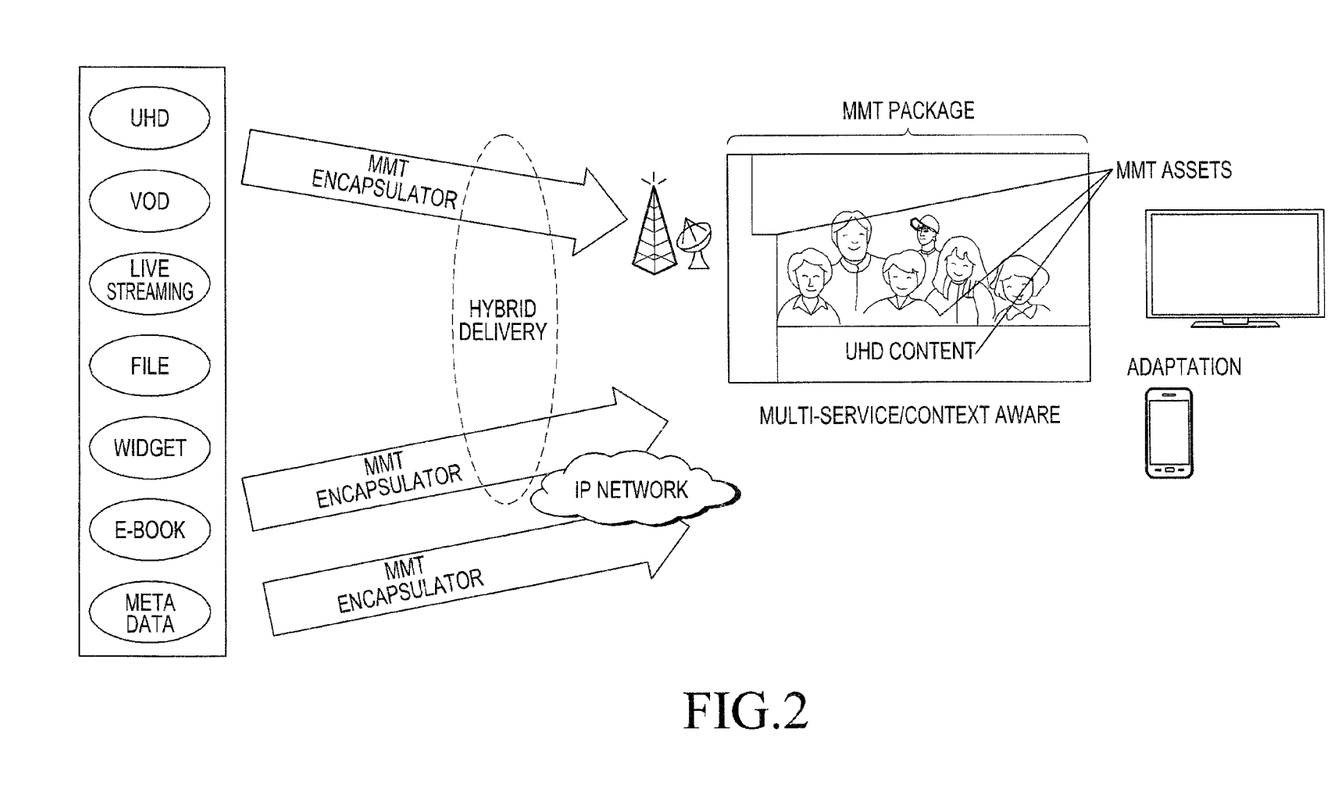
FIG. 2 is a view illustrating a concept of an MPEG Media Transport (MMT) service by a broadcast system based on an MMT standard according to an exemplary embodiment of the present invention.

FIG. 2 is a view illustrating a concept of an MMT service by a broadcast system (hereinafter, referred to as an "MMT system") based on an MMT standard according to an exemplary embodiments of the present invention.

Referring to FIG. 2, content for the MMT service may include UHD, Video On Demand (VOD), live streaming, files, widgets, E-books, and metadata. However, the content for the MMT service may include any content that can be expressed in an electrical signal.

After multimedia data according to each of the various contents are encapsulated in a predetermined format by an MMT encapsulator, a multimedia frame is configured and the configured multimedia frame is transmitted to a subscriber terminal via a hybrid delivery through a heterogeneous network. The heterogeneous network denotes a network having a transmission environment in which a broadcast network and an IP network coexist.

The subscriber terminal receives the multimedia frame transmitted in the hybrid delivery form through the heterogeneous network, extracts multimedia data corresponding to desired content from the multimedia frame, and provides a video/audio/application to a user based on the extracted multimedia data. Each multimedia data corresponding to the video/audio/application provided for a specific content is defined as an "MMT asset". The subscriber terminal may include any terminal that can support a multimedia service. A representative example of the subscriber terminal may include an IP TV or a smart phone. Accordingly, the MMT service may achieve objects of providing a high quality content delivery, a hybrid content support, and a hybrid network support.

Figure 3:
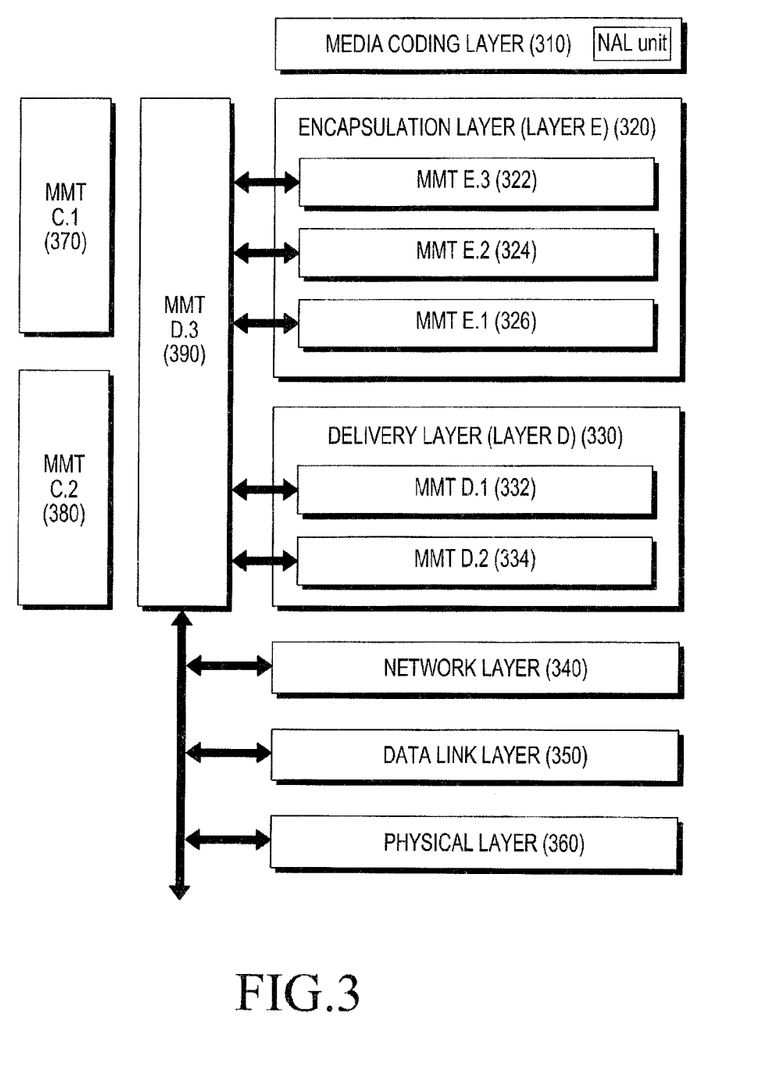
FIG. 3 illustrates a structure of layers for transmitting a multimedia frame according to a multi-service/content through a heterogeneous network in an MMT system according to an exemplary embodiment of the present invention.

FIG. 3 illustrates a structure of layers for transmitting a multimedia frame according to a multi-service/content through a heterogeneous network in an MMT system according to an exemplary embodiment of the present invention.

Referring to FIG. 3, seven layers are required for transmitting a configured multimedia frame. The seven layers include a media coding layer 310, an encapsulation layer (hereinafter, referred to as a "Layer E") 320, a delivery layer (hereinafter, referred to as a "Layer D" or a "Layer T") 330 or 390, a network layer 340, a data link layer 350, a physical layer 360, and a control layer (hereinafter, referred to as a "Layer C") 370 and 380.

According to exemplary embodiments of the present invention, multimedia data according to a multi-content or a multi-service is generated by the media coding layer 310 and the Layer E 320, so that the two layers may be considered as elements of a "multimedia data generation part". A multimedia frame is configured by the Layer D 330, so that the Layer D 300 may be considered as an element of a "multimedia frame configuration part". The Layer D 330 included in the multimedia frame configuration part includes header information containing a frame identifier and information required for measuring a quality of a connection service between network layers and end-to-end network capabilities, and configures a multimedia frame by combining the header information and multimedia data.

Technology areas corresponding to three layers among the seven layers are important for the MMT standard. The three technology areas correspond to the Layer E 320, the Layer D 330 and 390, and the Layer C 370 and 380, respectively. The Layer E 320 plays a role of generating hybrid content, the Layer D 330 and 390 plays a role of efficiently transmitting the generated content through a heterogeneous network, and the Layer C 370 and 380 plays a role for a general control in a consumption management and a transmission management of the hybrid content.

The Layer E 320 includes an MMT E.3 layer 322, an MMT E.2 layer 324, and an MMT E.1 layer 326. The MMT E.3 layer 322 receives an input of coded multimedia data provided from the media coding layer 310 and generates a data fragment which is the basic unit for the MMT service. The MMT E.2 layer 324 generates an Access Unit (AU) for the MMT service based on the data fragment generated by the MMT E.3 layer 322. The MMT E.1 layer 326 generates a format for generation, storage, and transmission of the hybrid content through a combination or a division of the AUs provided by the MMT E.2 layer 324.

The Layer D 330 and 390 includes an MMT D.1 layer 332, an MMT D.2 layer 334, and an MMT D.3 layer 390. The MMT D.1 layer 332 corresponds to an Application Protocol (AP) performing a similar role as the Real-time Transfer Protocol (RTP) or the HyperText Transfer Protocol (HTTP). The MMT D.2 layer 334 corresponds to a network layer protocol performing a similar role as the User Datagram Protocol (UDP) or the Transmission Control Protocol (TCP). The MMT D.3 layer 390 performs an operation for an optimization between respective layers included in the Layer E 320 and respective layers included in the Layer D 330.

The Layer C 370 and 380 includes an MMT C.1 layer 370 and a MMT C.2 layer 380. The MMT C.1 layer 370 provides information on generation and consumption of hybrid content and the MMT C.2 layer 380 provides information on transmission of the hybrid content.

Figure 4:
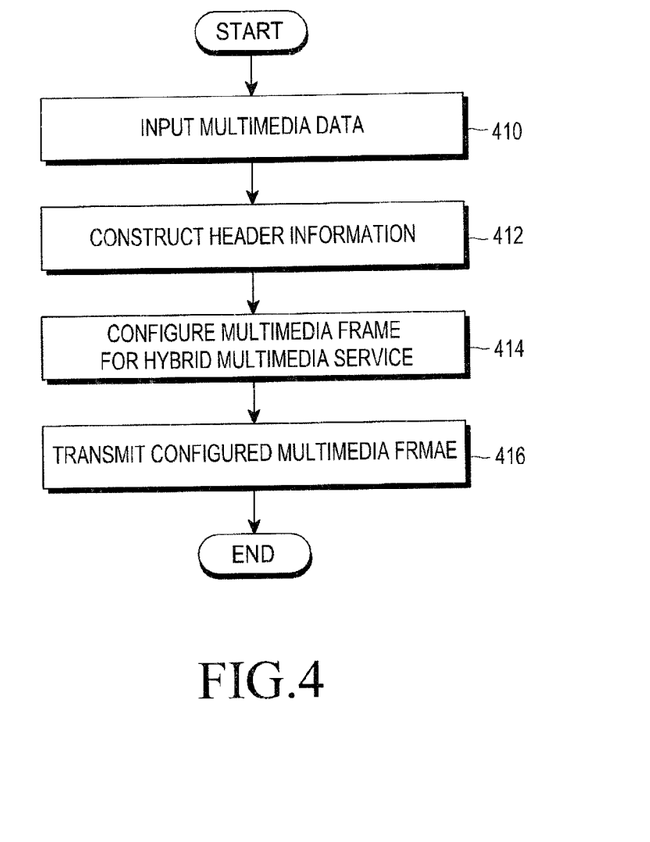
FIG. 4 is a flowchart in which a multimedia frame is configured and the configured multimedia frame is transmitted in an MMT system according to an exemplary embodiment of the present invention.

FIG. 4 is a flowchart in which a multimedia frame is configured and the configured multimedia frame is transmitted in an MMT system according to an exemplary embodiment of the present invention. FIG. 4 defines an operation performed by the MMT D.2 layer 334 included in the Layer D 330 among the layers shown in FIG. 3.

Referring to FIG. 4, the MMT D.2 layer 334 receives an input of multimedia data provided from the MMT D.1 layer 332 in step 410. Sufficient multimedia data to provide a hybrid service or hybrid content and an MMT asset for each multimedia data should be provided from the MMT D.1 layer 332.

The MMT D.2 layer 334 constructs header information for configuring a multimedia frame in step 412. The header information contains at least a frame identifier distinguishing a multimedia frame and information required for measuring a quality of a connection service between network layers and end-to-end network capabilities. A more detailed description for constructing the header information is provided below.

The MMT D.2 layer 334 configures a multimedia frame for a hybrid multimedia service in step 414. A multimedia frame is configured by combining the multimedia data input in step 410 and the header information constructed in step 412. After the multimedia frame is configured, the MMT D.2 334 transmits the configured multimedia frame to a subscriber terminal through a heterogeneous network in step 416.

A method of how to configure a multimedia frame (T Frame) by the Layer T2 in charge of transmitting the multimedia frame according to the MMT service proposed in exemplary embodiments of the present invention is described below. For the configuration of the multimedia frame (T Frame), header information to be recorded in a header region and multimedia data to be recorded in a payload region should be defined. Further, Quality of Service (QoS) for the multimedia frame (T Frame) according to exemplary embodiments of the present invention should be guaranteed.

In addition, a method should be provided to perform a flow control for the multimedia frame configured according to exemplary embodiments of the present invention. A function provided by an IP protocol should be replaced by means of the flow control and a QoS level according to exemplary embodiments of the present invention.

Finally, exemplary embodiments of the present invention should define a procedure in which the Layer T2 exchanges information with other layers and content and a transmission method of information exchanged through the procedure in order to transmit the AU.

The header information to be recorded in the header region of the multimedia frame (T Frame) according to exemplary embodiments of the present invention is defined as follows.

Table 1 below shows a structure of the multimedia frame.

TABLE 1

| Frame Header | Payload |
|---|---|

As shown in Table 1, the multimedia frame has a frame header region and a payload region. The frame header region records header information corresponding to control information required to receive multimedia data according to a hybrid service/content transmitted through the multimedia frame. The payload region records multimedia data according to a hybrid service/content.

Table 2 below shows an example of header information recorded in a frame header region included in a multimedia frame.

TABLE 2

| Bits | 0-15 | 16-31 |
|---|---|---|
| 0 | Frame ID | Length |
| 32 | Flow_Label | MAU_Abstraction_Information |

Table 2 shows an example of 64 bit header information. In the header information, a frame identifier is indicated by the first 16 bits ($0^{th}$-$15^{th}$ bits). A length of a datagram obtained or assembled by multimedia data recorded in the multimedia frame is indicated by the second 16 bits ($16^{th}$-$31^{st}$ bits). Flow_Label is indicated by the third 16 bits ($32^{nd}$-$47^{th}$ bits), and Media Access Unit (MAU) abstraction information (MAU_Abstraction_Information) is indicated by the fourth 16 bits ($48^{th}$-$63^{rd}$ bits).

The frame identifier (Frame ID) corresponds to identification information for distinguishing a corresponding multimedia frame (T Frame). For example, when a transmitting side fragments multimedia data and transmits the fragmented multimedia data through a plurality of multimedia frames, the frame identifier (Frame ID) may be used for assembling a plurality of multimedia data through the plurality of multimedia frames by a receiving side.

Accordingly, indexes corresponding to an order of transmitted multimedia frames may be used as an example of the frame identifier (Frame ID). In some cases, the frame identifier (Frame ID) is used as an index corresponding to an identifier of an asset or a transmitted multimedia frame.

The length (Length) corresponds to a length of a datagram measured in the unit of bytes. The datagram refers to a data packet obtained by multimedia data transmitted through one or a plurality of multimedia frames.

For example, one datagram may be transmitted by a payload of one multimedia frame. Alternatively, one datagram may be divided into a plurality of multimedia data blocks, and the divided multimedia data blocks may be transmitted by payloads of different multimedia frames.

Accordingly, a receiving side identifies a length of multimedia data recorded in the payload of the received multimedia frame through the length recorded in the header information of the received multimedia frame and then can identify whether the datagram is fragmented. For example, when a length recorded in the header information is the same as a length of multimedia data recorded in the payload, the receiving side considers the multimedia data recorded in the payload as the datagram. When a length recorded in the header information is not the same as a length of multimedia data recorded in the payload, the receiving side assembles the received multimedia data with multimedia data recorded in the payload of the multimedia frame received before or after the received multimedia data and obtains a datagram having a length recorded in the header information.

A plurality of datagrams may be included within a payload of one multimedia frame. In this case, multimedia data corresponding to a plurality of services or contents recorded in one payload are separated from each other and an independent datagram is obtained only by the separated multimedia data or may be obtained by a combination of the separated multimedia data and multimedia data received before or to be received after the separated multimedia data in consideration of the length recorded in the header information.

The Flow_Label identifies a specific QoS required for each flow. For example, the Flow_Label may be used as a field for identifying the MAU. When the Flow_Label is used as a field for identifying the MAU, 8 bits for indicating the Flow_Label may be defined as shown in Tables 3 to 7 below.

A bit rate, which may be expressed by the first 3 bits ($1^{th}$-$3^{rd}$ bits), is defined in Table 3 below. A degree of delay, which may be expressed by the next one bit ($4^{th}$ bit), is defined in Table 4 below. A throughput, which may be expressed by the next one bit ($5^{th}$ bit), is defined in Table 5 below. A synchronization expressed by the next one bit ($6^{th}$ bit), which is a relation with another multimedia frame, is defined in Table 6 below. The last 2 bits ($7^{th}$-$8^{th}$ bits) may be used as reserved bits, as shown in Table 7 below.

TABLE 3

| Bits 0-2 | Bit rate |
|---|---|
| 111 | Constant Bit Rate (CBR) |
| 110 | Real-Time Variable Bit Rate (RT-VBR) |
| 101 | Non-Real-Time Variable Bit Rate (NRT-VBR) |
| 100 | Available Bit Rate (ABR) |
| 011 | Unspecified Bit Rate (UBR) |
| 010 | Reserved |
| 001 | Reserved |
| 000 | Reserved |

TABLE 4

| bit 3 | Delay |
|---|---|
| 0 | Normal delay |
| 1 | Low delay |

TABLE 5

| Bit 4 | Throughput |
|---|---|
| 0 | Normal throughput |
| 1 | High throughput |

TABLE 6

| Bit 5 | Synchronization |
|---|---|
| 0 | no relationship |
| 1 | relationship with another T-frame |

TABLE 7

| bits 6-7 | Reserved for future use |
|---|---|

The MAU_Abstraction_Information provides abstract information for accessing flexible and efficient mechanism of a service class. For example, a set of parameters defined by the MAU_Abstraction_Information is negotiated when a connection is configured within a network. The parameters are used to measure QoS of a connection between network layers and end-to-end network capabilities. Accordingly, in the network, QoS should be guaranteed by the negotiation by satisfying a specific value of the parameters defined by the MAU_Abstraction_Information.

For example, the parameters defined by the MAU_Abstraction_Information may include Delay (range) and an AU loss rate (%). The Delay (range) denotes a maximum end-to-end delay time for a transmission of a multimedia frame and the AU loss rate (5) denotes an Access Unit Loss Ratio (AULR). A percentage of the AU denotes an allowed loss.

For example, when 5 bits are used for the MAU_Abstraction_Information, the Delay (range) is defined by the first 3 bits ($1^{th}$-$3^{rd}$ bits) and the AU loss rate (%) is defined by the next 2 bits ($4^{th}$-$5^{th}$ bits).

Table 8 below defines the Delay (range), which is the maximum end-to-end delay time as defined above.

TABLE 8

| Bit 0-2 | Delay |
|---|---|
| 111 | 500 ms |
| 110 | 1 sec |
| 101 | 5 sec |
| 100 | 10 sec |
| 011 | unlimited |
| 010 | |
| 001 | |
| 000 | |

Table 9 below defines the AU loss rate (5), which is the AULR as defined above.

TABLE 9

| Bit 3-4 | AULR |
|---|---|
| 111 | 0% |
| 110 | 10% |
| 101 | 20% |
| 100 | 30% |
| 011 | 50% |
| 010 | not specified |
| 001 | |
| 000 | |

In the foregoing description, the structure of the multimedia frame and examples of the definition and the construction of the header information recorded in the header region included in the multimedia frame have been described, respectively.

Hereinafter, it will be described that the MMT D.2 layer communicates with the MMT D.1 layer or the MMT C.2 layer based on an Application Program Interface (API) or a Type-Length-Value (TLV) for exemplary embodiments of the present invention.

First, referring to communication with the MMT D.1 layer, the MMT D.1 layer provides the ME D.2 layer with multimedia data in a predetermined unit, which is the AU. The MMT D.1 layer provides the MMT D.2 layer with characteristics of the AU for guaranteeing the setting in the configuration of the multimedia frame and the QoS in the transmission of the multimedia frame by the MMT D.2 layer.

The MMT C.2 layer configures a multimedia frame and performs communication for providing the MMT D.2 layer with control information required for a transmission of the multimedia frame. For example, the MMT C.2 layer provides the MMT D.2 layer with Session Management Information (SMI), Session Monitoring Information (SMI), and Error Control Information (ECI) through communication with the MMT D.2 layer.

The MMT D.2 layer receives the session management information from the MMT C.2 layer in order to manage a session control. At this time, the session management information contains an adaptive delivery and a change delivery path. For example, the MMT D.2 layer manages a transport related to properties of a bit rate, a delay time, and a loss rate based on the session management information provided by the MMT C.2 layer. The MMT D.2 layer exchanges the session management information with the MMT C.2 layer in order to support a management as described above. A server may modify a transmission path to a client based on a re-negotiation configuration or a session modification message, which is requested by a client, transmitted to the server.

The MMT D.2 layer receives session monitoring (feedback) information from the MMT C.2 layer in order to monitor a session. For example, the MMT D.2 layer may provide information for a session monitoring through the Flow_Label and the MAU_Abstraction_Information. Information on the delay time and the loss rate may be used as parameters for monitoring.

The MMT C.2 layer may make a request for a Forward Error Correction (FEC) or a retransmission such as an error control from the MMT D.2 layer. The MMT D.2 layer may configure a multimedia frame such that the MMT D.2 layer supports the error correction or the error control when a request for the error correction or the error control is made from the MMT C.2 layer.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting a frame in a broadcast system, the method comprising:
    generating a frame comprising header information and multimedia data; and
    transmitting the generated frame to a subscriber terminal over a heterogeneous network based on a motion picture experts group (MPEG) media transport (MMT) protocol,
    wherein, when the generated frame supports quality of service (QoS), the header information includes type information and delay sensitivity information,
    wherein the type information identifies whether a bit rate is constant or not, and the delay sensitivity information indicates a delay sensitivity of the multimedia data, and
    wherein the type information and the delay sensitivity information are used for flow control over the heterogeneous network.

2. The method as claimed in claim 1, wherein a flow for transmitting the generated frame is controlled based on the type information and a flag included in the header information.

3. The method as claimed in claim 1, wherein the header information further comprises a flow label indicating a QoS requested for each flow.

4. The method as claimed in claim 1, wherein the header information further comprises information about segmentation or combination of the multimedia data.

* * * * *